No. 893,175. PATENTED JULY 14, 1908.
G. LAUTERBACK.
CAN CAP.
APPLICATION FILED MAY 5, 1908.
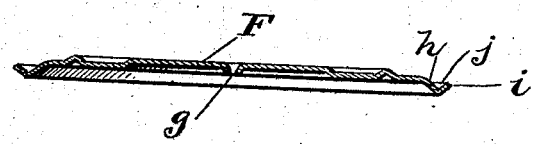
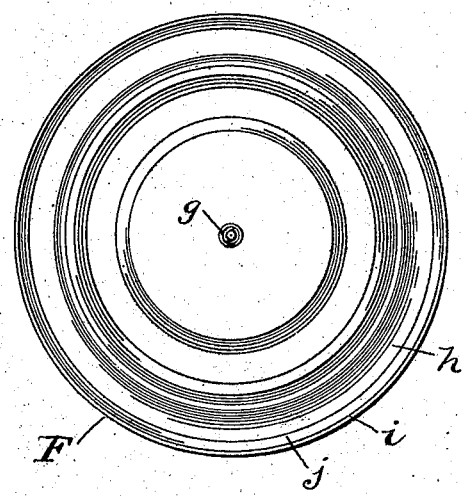
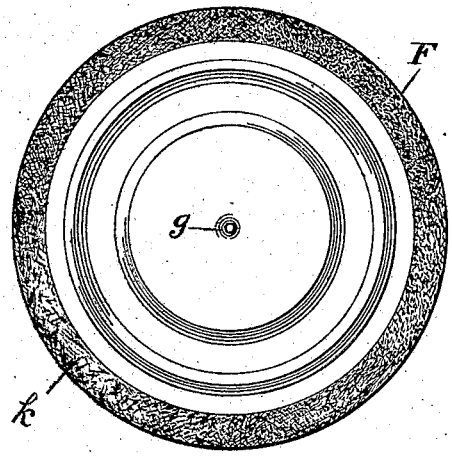
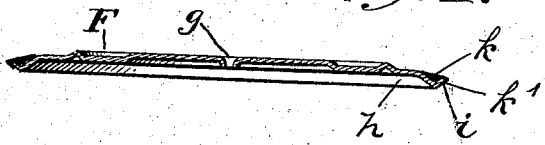
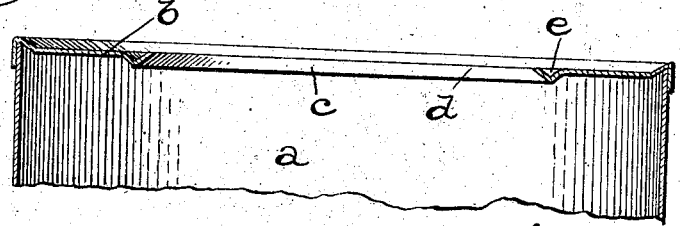
Witnesses
Edwin L. Yewell
G. Ferd. Vogt
Inventor
George Lauterback
By Mann & Co,
Attorneys

UNITED STATES PATENT OFFICE.

GEORGE LAUTERBACK, OF BALTIMORE, MARYLAND.

CAN-CAP.

No. 893,175.  Specification of Letters Patent.  Patented July 14, 1908.

Application filed May 5, 1906. Serial No. 315,275.

*To all whom it may concern:*

Be it known that I, GEORGE LAUTERBACK, a citizen of the United States, residing at Baltimore, in the State of Maryland, have invented certain new and useful Improvements in Can-Caps, of which the following is a specification.

This invention relates to a can-cap provided with solder.

The ordinary tin-can used for hermetically sealing fruits, vegetables and other foods has a circular top-opening, which is closed after the can has been filled by caps of the character here referred to. There is a recognized advantage in affixing to these can-caps the exact quantity of solder that should be used to secure the cap to the can-top.

The object of the present invention is to provide an improved ready-soldered cap for closing filled cans.

The invention is illustrated in the drawing, in which,—

Figure 1 is a diametrical section of the can-cap before the solder is applied. Fig. 2 is a top view of the same. Fig. 3 is a top view of the ready-soldered can-cap. Fig. 4 is a section of the cap showing the solder affixed to it. Fig. 5 is a section view of a can-top showing the opening that is to be closed by the cap.

The letter, $a$, designates a portion of the wall of a tin-can; $b$, the top of the can; $c$, the opening in the top and, $d$, an upturned flange surrounding the edge of the opening. Adjoining and around this up-turned flange of the can-top is a depression, $e$, which constitutes the annular groove of the ordinary can. This groove in cross-section is approximately V-shaped.

The cap, F, is provided with the usual central vent hole, $g$, and the down-turned rim, $h$, has a pitch or angle position that corresponds with the up-turned position of the flange, $d$, on the can-top, so that when the cap is placed over the can-top opening to close the latter said down-turned rim, $h$, and up-turned flange, $d$, will contact. The cap also has around the said rim an up-turned lip, $i$, whose pitch or inclination corresponds with the pitch of the annular depression, $e$. In cross-section the rim-edge of the cap has the form of a V and the lower surface of the up-turned lip, $i$, contacts with one side of the upper surface of the depressed annular groove, $e$, of the can-top. The up-turned lip, $i$, forms on top of the cap an annular gutter, $j$, adjacent the peripheral edge. This cap has its supply of solder attached partly in the top annular gutter, $j$, where the solder is fused and designated in the drawing by the letter, $k$, partly on the peripheral cut-edge which is thinly coated with solder, and partly on the lower inclined surface of the up-turned lip, $i$, which is coated with solder, as at, $k'$.

A tin cap having the annular gutter adjacent its rim wherein the solder is fused, and the up-turned lip around the rim coated with solder on its lower inclined surface, constitutes an article possessing practical advantages. When a heated soldering tool is brought into operation on this cap, its edge will fit into the annular gutter, $j$, and melt the solder and cause it to overflow the rim-edge of the lip, $i$, into the annular depression, $e$, of the can-top and the fused solder will make a tight joint between the cap and can-top.

Having thus described my invention what I claim as new and desire to secure by Letters Patent is,—

1. A can-cap consisting of a metal plate having a down-turned rim provided with an up-turned lip around the rim which forms a top annular gutter, and a solder filling in said top gutter and covering the edge of the up-turned lip and also coated on the lower inclined surface of said up-turned lip.

2. A cap for closing the top-opening of tin cans, consisting of a metal disk having around its circumferential rim an up-turned lip edge which in cross-section has a V-shaped form, and solder fused on top of the disk and around said lip edge.

In testimony whereof I affix my signature in presence of two witnesses.

GEORGE LAUTERBACK.

Witnesses:
 CHAS. B. MANN,
 JOHN W. HEWES.